United States Patent
Suh

(10) Patent No.: US 7,428,204 B2
(45) Date of Patent: *Sep. 23, 2008

(54) METHOD FOR RECORDING ADDRESS INFORMATION ON OPTICAL RECORDING MEDIUM, OPTICAL RECORDING MEDIUM INCLUDING ADDRESS INFORMATION RECORDED THEREON BY THE SAME METHOD, AND METHOD FOR DETECTING ADDRESS INFORMATION RECORDED ON THE SAME OPTICAL RECORDING MEDIUM

(75) Inventor: Sang Woon Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/808,483

(22) Filed: Jun. 11, 2007

(65) Prior Publication Data

US 2007/0263512 A1    Nov. 15, 2007

Related U.S. Application Data

(63) Continuation of application No. 10/288,416, filed on Nov. 6, 2002, now Pat. No. 7,230,901.

(30) Foreign Application Priority Data

Nov. 6, 2001    (KR) ............................... 2001-69002

(51) Int. Cl.
   *G11B 7/0045*    (2006.01)
(52) U.S. Cl. .................. 369/59.25; 369/44.13; 369/120
(58) Field of Classification Search ........................ None
   See application file for complete search history.

(56) References Cited

U.S. PATENT DOCUMENTS

| 5,999,504 | A | 12/1999 | Aoki et al. |
|---|---|---|---|
| 6,201,773 | B1 | 3/2001 | Aoki et al. |
| 6,201,778 | B1 | 3/2001 | Sensyu et al. |
| 6,501,721 | B2 | 12/2002 | Hogan |
| 6,693,873 | B2 | 2/2004 | Kondo et al. |
| 6,813,230 | B1 | 11/2004 | Ko et al. |
| 6,947,364 | B1 | 9/2005 | Hogan et al. |
| 7,289,410 | B2 * | 10/2007 | Chen et al. ............... 369/53.34 |

(Continued)

FOREIGN PATENT DOCUMENTS

EP    1 058 239 A2    12/2000

(Continued)

*Primary Examiner*—Joseph Feild
*Assistant Examiner*—Joseph Haley
(74) *Attorney, Agent, or Firm*—Birch, Stewart, Kolasch & Birch, LLP

(57) ABSTRACT

A method for recording address information on an optical recording medium, and the optical recording medium are discussed. According to an embodiment, there is provided an optical recording medium including a wobble-shaped recording track that is formed thereon based on a wobble signal, the wobble signal being modulated by a predetermined modulation method, wherein a physical address information is included in the wobble modulation, data bit "0" and "1" comprising the physical address information being comprised of a 2n+4 (n≧0)-wobble basis and being distinguished from each other such that each data bit has at least three same values and at least one different value in the modulated wobble signal with respect to the 2n+4 (n≧0)-wobble basis.

22 Claims, 5 Drawing Sheets

U.S. PATENT DOCUMENTS

| | | |
|---|---|---|
| 2001/0030914 A1 | 10/2001 | Kim et al. |
| 2001/0033543 A1 | 10/2001 | Akiyama et al. |

FOREIGN PATENT DOCUMENTS

| | | |
|---|---|---|
| EP | 1 098 302 A2 | 5/2001 |
| EP | 1 150 283 A3 | 10/2001 |
| JP | 10-069646 | 3/1998 |
| JP | 10-283677 | 10/1998 |
| JP | 11-045441 | 2/1999 |
| JP | 2000-339688 | 12/2000 |
| KR | 10-2001-0049239 | 6/2001 |
| WO | WO-98/54703 A1 | 12/1998 |

* cited by examiner

< ASK modulation waveform >

| Input data | Pre-coded data | Modified M=1 ASK modulation waveform |
|---|---|---|
| "0" | "11101110" | <br>Modified ASK modulation period |
| "1" | "11111110" | <br>Modified ASK modulation period |

METHOD FOR RECORDING ADDRESS INFORMATION ON OPTICAL RECORDING MEDIUM, OPTICAL RECORDING MEDIUM INCLUDING ADDRESS INFORMATION RECORDED THEREON BY THE SAME METHOD, AND METHOD FOR DETECTING ADDRESS INFORMATION RECORDED ON THE SAME OPTICAL RECORDING MEDIUM

This application is a Continuation of application Ser. No. 10/288,416 filed on Nov. 6, 2002 now U.S. Pat. No. 7,230,901, and for which priority is claimed under 35 U.S.C. § 120; and this application claims priority of Application No. 10-2001-0069002 filed in Korea on Nov. 6, 2001 under 35 U.S.C. § 119; the entire contents of all are hereby incorporated by reference.

BACKGROUND OF THE INVENTION

1. Field of the Invention

The present invention relates to a method for recording address information on an optical recording medium, an optical recording medium including address information recorded thereon by the same method, and a method for detecting the address information recorded on the optical recording medium.

2. Description of the Related Art

A general recordable optical disc (optical recording medium) such as a DVD-RAM or a DVD-RW (Re-Writable) has a recess formed along a track having a spiral or concentric-circle form. The recessed portion is called a groove, and the remaining portion is called a land. There are two methods of recording data on the optical disc. One method is to record data on one of the groove and the land, and the other is to record data on both of them. When the groove is formed, a specific variation is formed in the wall of the groove. During the recording or reproducing operation, the specific variation produces a signal having a specific frequency. Thus, the specific variation is used as auxiliary clock means. The specific variation is called a wobble, and the signal having the specific frequency is called a wobble signal.

Meanwhile, physical address information should be formed in advance on the optical disc. To this end, a CAPA (Complementary Allocated Pit Addressing) method is used for the DVD-RAM, and a land pre-pit addressing method is used for the DVD-RW. In the CAPA method, sector-by-sector address information is formed and recorded in the pre-pit form at the head of each of the sectors for the physical addressing. The CAPA method has an advantage in that a sector-by-sector addressing can be performed, but has a problem that, because the address information is recorded on a sector-by-sector basis on the data recording region on which real data is to be recorded, the data recording capacity for recording real data is reduced.

On the other hand, the land pre-pit addressing method used in the DVD-RW has a problem that the address decoding performance may be lowered depending on the state of the disc and recording/reproducing conditions such as a tilt of the disc.

SUMMARY OF THE INVENTION

Therefore, the present invention has been made in view of the above problems, and it is an object of the present invention to provide a method for recording address information on an optical recording medium, an optical recording medium including address information recorded thereon by the same method, and a method for detecting the address information recorded on the same optical recording medium, which can decode physical address information accurately using a phase locked loop circuit and a wobble signal detecting circuit having a simple configuration, without reducing the data recording capacity of the optical recording medium.

In accordance with one aspect of the present invention, the above and other objects can be accomplished by the provision of a method for recording address information on an optical recording medium, the method comprising: a first step of ASK(Amplitude Shift Keying)-modulating physical address information of an optical recording medium so as to convert the physical address information into a wobble signal; and a second step of forming a wobble-shaped recording track on the optical recording medium using the converted wobble signal, thereby recording the physical address information on the recording medium.

In accordance with yet another aspect of the present invention, there is provided a method for recording address information on an optical recording medium, the method comprising: a first step of pre-coding physical address information of an optical recording medium in a predetermined recording-size basis; a second step of ASK-modulating the pre-coded physical address information so as to convert the physical address information into a wobble signal; and a third step of forming a wobble-shaped recording track on the optical recording medium using the converted wobble signal, thereby recording the physical address information on the recording medium.

Preferably, in the first step, the physical address information is pre-coded on a 2n+4(n=0, 1, 2, 3 . . . )-wobble basis.

In accordance with yet another aspect of the present invention, there is provided a method for detecting address information recorded on an optical recording medium on which the physical address is recorded after being pre-coded on a 2n+4(n=0, 1, 2, 3 . . . )-wobble basis, the method comprising the steps of: detecting an wobble signal based on light reflected from a wobble pattern of a groove as a recording track formed on the optical recording medium; and after shaping the waveform of the detected wobble signal to a square wave, recovering the physical address information by comparing/mapping the square wave on a 2n+4-wobble basis.

Preferably, an optical recording medium according to the present invention includes a wobble-shaped recording track that is formed thereon based on a wobble signal, said wobble signal being generated by ASK-modulating physical address information.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
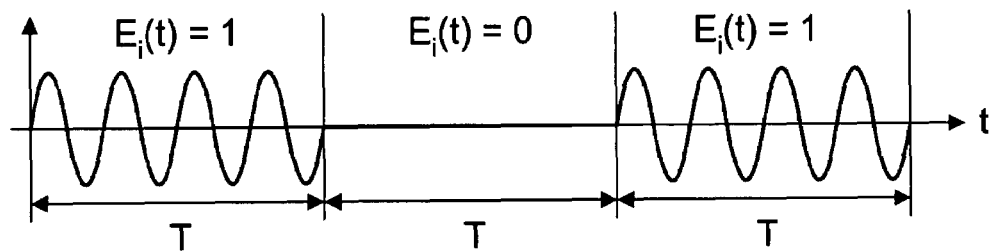
FIG. 1 is a view showing an example of ASK (Amplitude Shift Keying) modulation waveform for illustrating an ASK modulation applied to the present invention.

Referring to the drawings, a detailed description will now be given of a method for recording address information on an optical recording medium, an optical recording medium on which address information is recorded by the same method, and a method for detecting the address information recorded on the same optical recording medium, according to a preferred embodiment of the present invention.

First, a method for recording address information on an optical recording medium according to the present invention uses an ASK (Amplitude Shift Keying) modulation. The ASK modulation scheme correlates different amplitudes of sinusoidal waves having a specific frequency depending on whether or not a pulse exists. The ASK modulation scheme is expressed by the following equation.

$$S_{ASK} = \sqrt{\frac{2E_i(t)}{T}} \sin(2\pi f_c t + \phi)$$

Here, i=1, 2, 3, ... M, 0≦t≦T.

For example, in the case where M=4, as shown in FIG. 1, the ASK modulation waveform ($S_{ASK}$) has four sine waves during one period (T) when $E_i(t)$=1, and has no wave during one period (T) when $E_i(t)$=0.

Meanwhile, a wobble-signal modulation scheme using the ASK modulation according to the present invention is expressed by the following equation.

$$S_{ASK} = \sqrt{\frac{2E_i(t)}{T}} \sin(2\pi f_c t)$$

Here, i=1, 2, 3, ... M, 0≦t≦T,
$f_c = f_w$ (wobble carrier frequency)
$T = T_b = 1/f_w$ (input data period)

Figure 2:
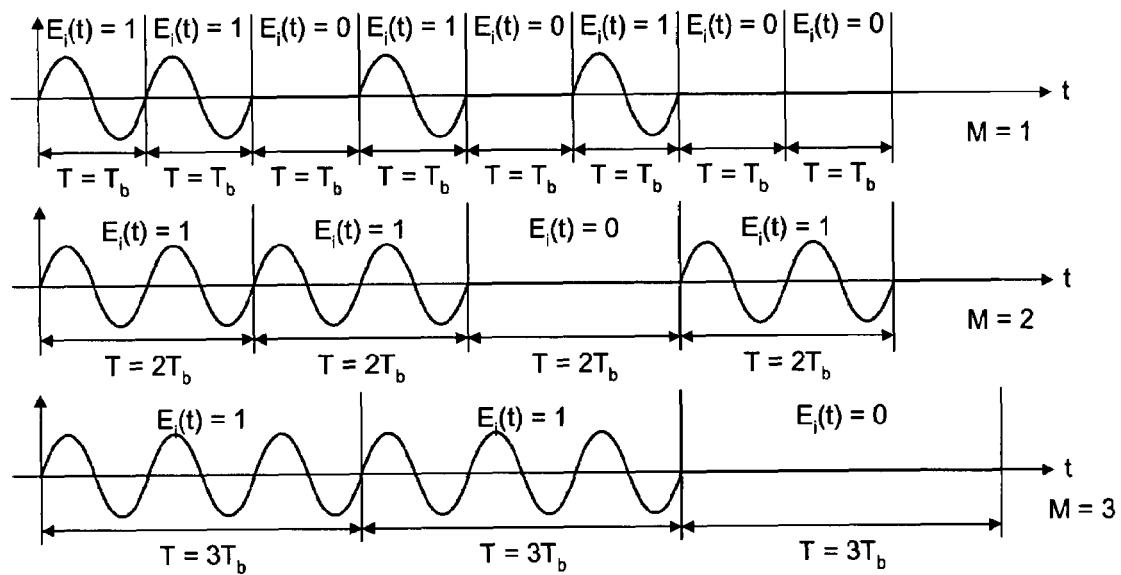
FIG. 2 is a waveform view illustrating an example of a method for ASK-modulating a wobble signal according to the present invention.

In the case where M=1, as shown in FIG. 2, the ASK modulation waveform ($S_{ASK}$) has one sine wave during an input data period ($T=T_b$) when $E_i(t)$=1, and has no wave during an input data period ($T=T_b$) when $E_i(t)$=0. In addition, in the case where M=2, the ASK modulation waveform ($S_{ASK}$) has two sine waves during an input data period ($T=2T_b$) when $E_i(t)$=1, and has no wave during an input data period ($T=2T_b$) when $E_i(t)$=0. Further, in the case where M=3, the ASK modulation waveform ($S_{ASK}$) has three sine waves during an input data period ($T=3T_b$) when $E_i(t)$=1, and has no wave during an input data period ($T=3T_b$) when $E_i(t)$=0.

Such a wobble signal modulation scheme using the ASK modulation may be applied in various cases such as M=1, 2, 3, 4, 5..., but the following description will describe only the case where M=1, for the sake of a simpler explanation.

First, in the method for recording address information on an optical recording medium according to the embodiment of the present invention, input data as the address information is pre-coded to a predetermined code value, and the ASK modulation is also used.

Figure 3:
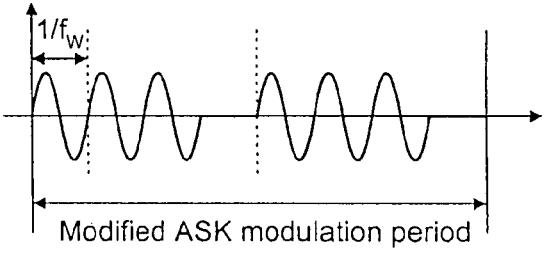
FIG. 3 is a view showing an example of a method for pre-coding a wobble signal to be ASK-modulated according to the present invention.
Figure 3:
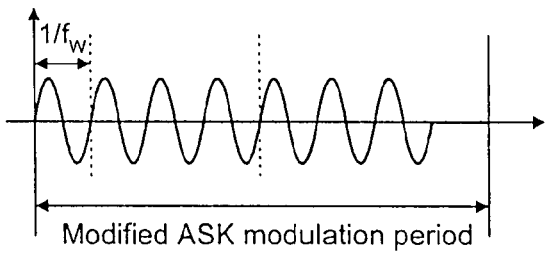

For example, as shown in FIG. 3, the input data can be ASK-modulated on an 8-wobble basis. In this case, the pre-coded data of 8 wobbles becomes '11101110' when the input data is '0', and it becomes '11111110' when the input data is '1'.

That is, when the input data is '0', the ASK modulation waveform consists of two identical and continuous portions, and each portion made of four wobble periods has three sine waves during first wobble periods and no wave during last wobble period. In addition, when the input data is '1', the ASK modulation waveform has 7 sine waves during first 7 wobble periods and no wave during last wobble period.

Meanwhile, the ASK modulation of the input data can be modulated on a 2n+4(n=0, 1, 2, ...)-wobble basis such as 4, 6, 8, ... For example, when the input data is ASK-modulated on a 4-wobble basis, the pre-coded data of 4 wobbles becomes '1010' when the input data is '0', and becomes '1110' when the input data is '1'.

Figure 4:
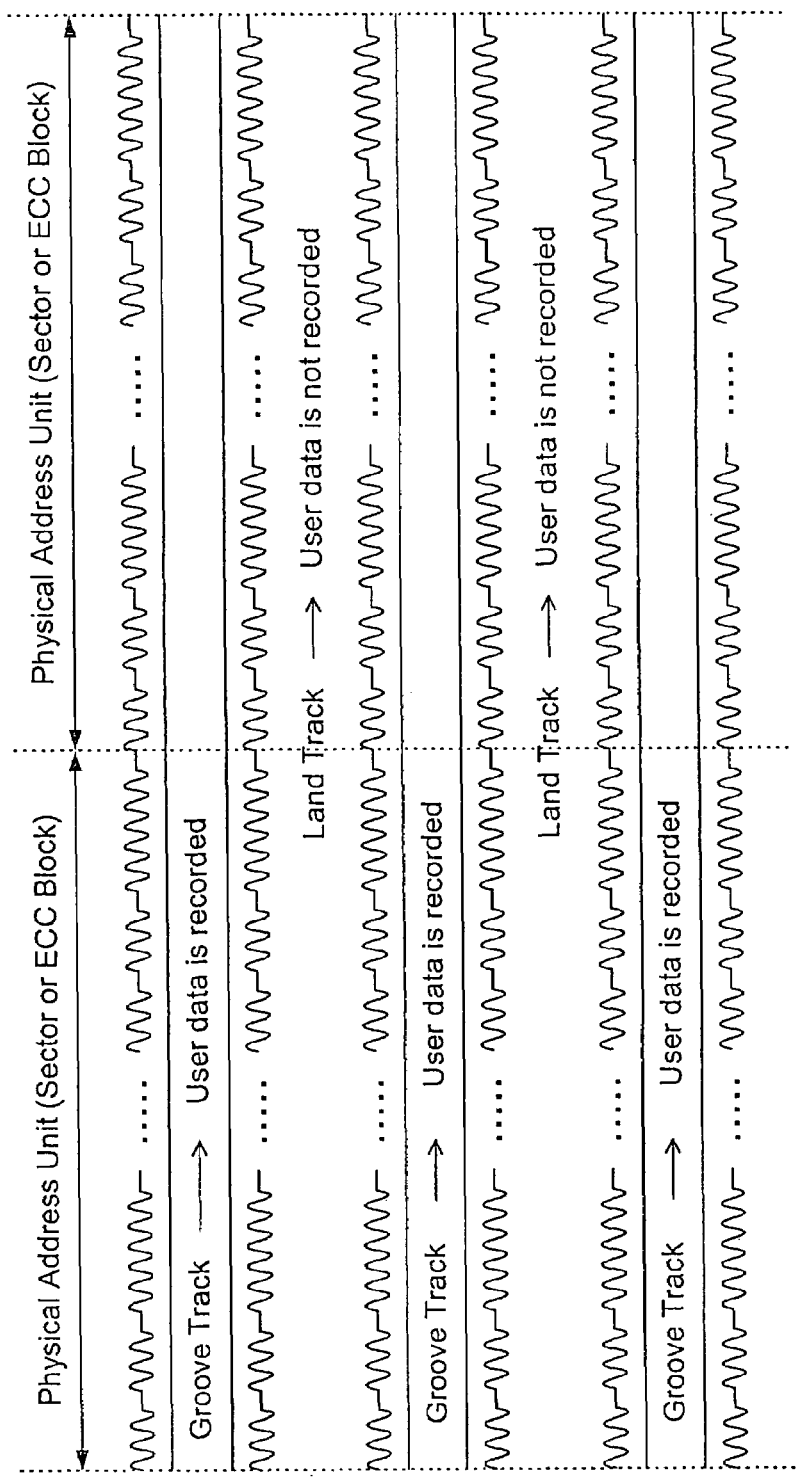
FIG. 4 is an exemplary view illustrating the waveform of a wobble signal recorded on an optical recording medium according to the present invention.

For example, an optical disc such as a GOR (Groove Only Recording) type DVD-RW, in which real data is not recorded in the land region but in the groove region, is used for an optical recording medium to which such a method for ASK-modulating and recording a wobble signal overlapped with address information is applied. In this case, as shown in FIG. 4, after the address information is pre-coded, the pre-coded data is ASK-modulated on a physical address basis such as a sector or ECC (error correction code) block to form a wobble signal as mentioned above, and a wobble-shaped groove is formed on the optical recording medium using the wobble signal, consequently achieving the forming and recording of the physical address information on the optical recording medium.

Figure 5:
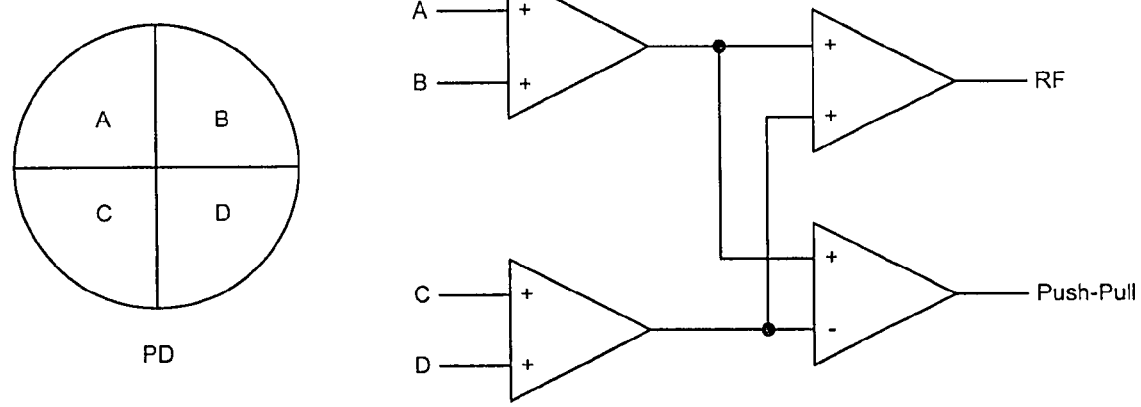
FIG. 5 is a view showing an example of a circuit for detecting the wobble signal recorded on the optical recording medium in an optical recording medium recording/reproducing device, according to the present invention.

As mentioned above, when the groove is formed on the optical recording medium, the address information is recorded in the wobble shape on the walls of the groove, based on the ASK-modulated wobble signal of the pre-coded data. The recorded address information can be detected by a general push-pull signal detecting circuit as shown in FIG. 5 during the recording/reproducing operations. That is, the push-pull signal detecting circuit includes four operational amplifiers, and receives electric signals output from A, B, C, and D regions of a 4-division photo detector included in an optical pickup. A RF signal is output from the push-pull signal detecting circuit through a RF output terminal. As a result of a logic operation of (A+B)−(C+D), a wobble signal is output as a detected signal therefrom through a push-pull output terminal.

Figure 6:
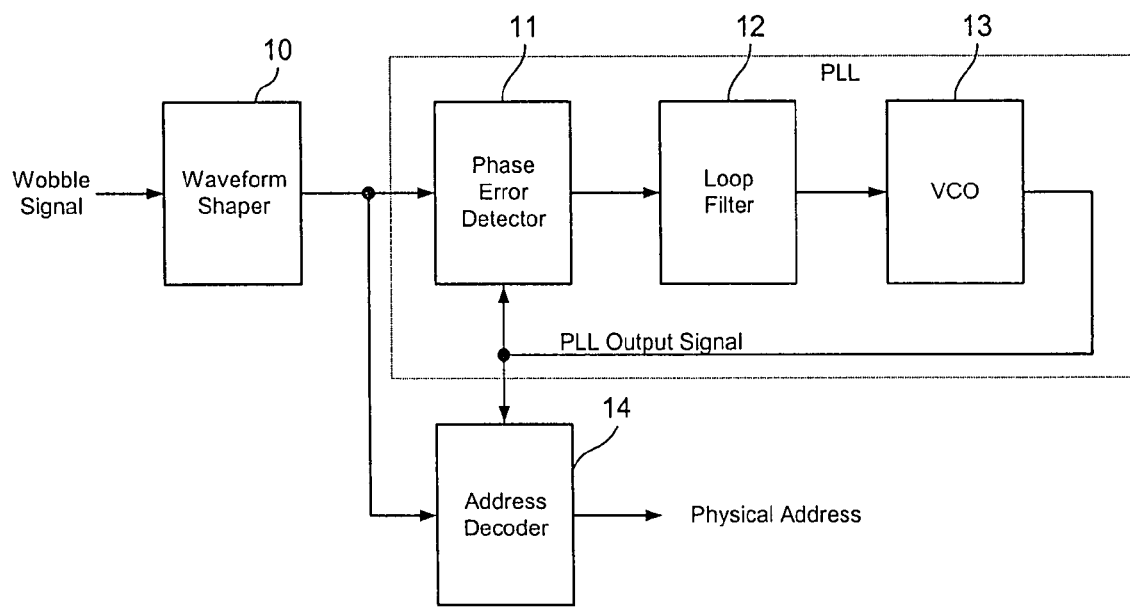
FIG. 6 is a view showing an example of a circuit for extracting physical address information from the wobble signal after detecting the wobble signal recorded on the optical recording medium in an optical recording medium recording/reproducing device, according to the present invention.
Figure 7:
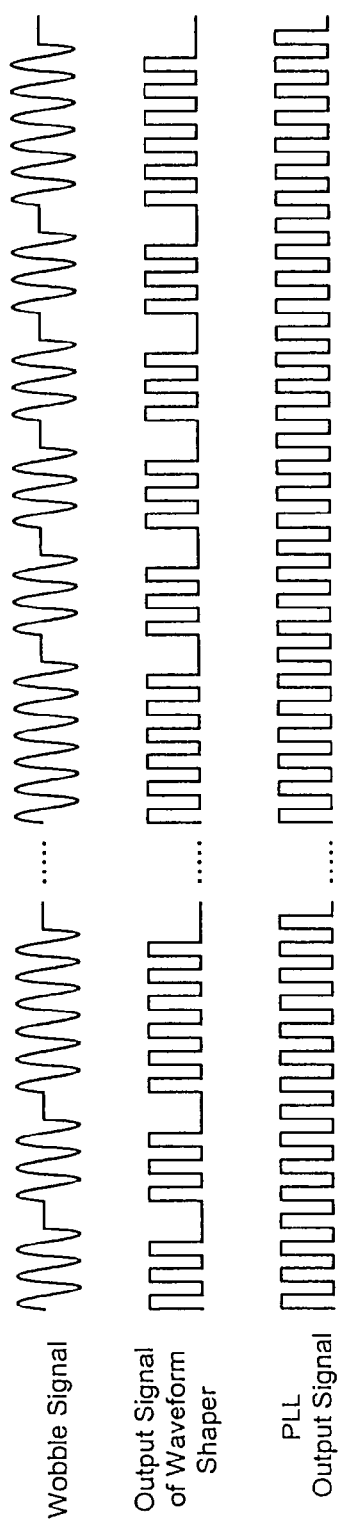
FIG. 7 is a view showing the waveform of signals in the configuration of FIG. 6.

In addition, the waveform of the wobble signal of sinusoidal wave (refer to FIG. 7) detected by the push-pull signal detecting circuit is shaped to a square wave by circuit 10, described below, as shown in FIG. 6. An address decoder 14 decodes the square wave data on a pre-coded data basis to obtain physical address information as a decoded data. In the case where an input data '0' was pre-coded to '11101110', and an input data '1' was pre-coded to '11111110', the square wave data is checked on a 8-bit basis, and if the checking result is '11101110', this is mapped to '0', and, if the checking result is '11111110', this is mapped to '1'. In such a manner, the physical address information is simply decoded. As shown in FIG. 6, such a device for obtaining the physical address information includes a general PLL (phase locked loop) circuit that comprises the phase error detector 11, the loop filter 12, and the voltage control oscillator (VCD) 13, and, differently from the prior art, further includes a waveform shaper 10 and the address decoder 14.

As apparent from the above description, the present invention has an advantage in that physical address information can be accurately decoded using a phase locked loop circuit and a wobble signal detecting circuit having a simple configuration, without reducing the data recording capacity of the optical recording medium.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical recording medium including a wobble-shaped recording track that is formed thereon based on a wobble signal, the wobble signal being modulated by a predetermined modulation method, wherein a physical address information is included in the wobble modulation, data bit "0" and "1" comprising the physical address information being comprised of a 2n+4 (n≧0)-wobble basis and being distinguished from each other such that each data bit has at least three same values and at least one different value in the modulated wobble signal with respect to the 2n+4 (n≧0)-wobble basis.

2. The optical recording medium of claim 1, wherein the wobble-shaped recording track is a groove.

3. The optical recording medium of claim 1, wherein the wobble signal corresponding to data bit "0" or "1" of the physical address information is made up of at least one signal followed by no signal wave.

4. The optical recording medium of claim 1, wherein the data bit "0" and "1" are modulated on a 8 wobble basis, respectively.

5. A method for detecting physical address information from an optical recording medium on which a wobble signal is-modulated by a predetermined modulation method, the method comprising:
    detecting the wobble signal based on light energy reflected from a wobble pattern of a groove formed on the optical recording medium; and
    recovering a physical address information based on the detected wobble signal,
    wherein a physical address information is included in the wobble modulation, data bit "0" and "1" comprising the physical address information being comprised of a 2n+4 (n≧0)-wobble basis and being distinguished from each other such that each data bit has at least three same values and at least one different value in the modulated wobble signal with respect to the 2n+4 (n ≧0) wobble basis.

6. The method of claim 5, wherein the detecting step detects the wobble signal by 4-division photo detector.

7. The method of claim 6, wherein the detecting step detects the wobble signal by a signal output from (A+B)−(C+D), where A, B, C and D is each region of the 4 division photo detector.

8. The method of claim 5, wherein the recovering step recovers the physical address information comprising data bit "0" and "1" with respect to the 2n+4 (n≧0)- wobble basis.

9. The method of claim 8, wherein the recovering step recovers the physical address information comprising the data bit "0" and "1", the data bit "0" and "1" being modulated on a 8 wobble basis respectively.

10. A method for reproducing a physical address information from a recording medium on which a wobble signal is modulated by a predetermined modulation method, the method comprising:
    detecting the wobble signal using a push-pull signal detection unit; and
    decoding a physical address information in response to the detected wobble signal,
    wherein a physical address information is included in the wobble modulation, data bit "0" and "1" comprising the physical address information being comprised of a 2n+4 (n≧0)-wobble basis and being distinguished from each other such that each data bit has at least three same values and at least one different value in the modulated wobble signal with respect to the 2n+4 (n ≧0)-wobble basis.

11. The method of claim 10, wherein the detecting step detects the wobble signal by 4-division photo detector.

12. The method of claim 11, wherein the, detecting step detects the wobble signal by a signal output from (A+B)−(C+D), where A, B, C and D is each region of 4 division photo detector.

13. The method of claim 10, wherein the decoding step decodes the physical address information comprising data bit "0" and "1" with respect to the 2n≧4 (n≧0)-wobble basis.

14. The method of claim 13, wherein the decoding step decodes the physical address information comprising the data bit "0" and "1", the data bit "0" and "1" being modulated on a 8 wobble basis respectively.

15. An apparatus for detecting physical address information from an optical recording medium on which a wobble signal is modulated by a predetermined modulation method, comprising:
    a detection unit to detect the wobble signal based on light energy reflected from a wobble pattern of a groove formed on the optical recording medium; and
    a recovering unit to recover the physical address information based on the wobble signal detected from the detection unit, wherein data bit "0" and "1" comprising the physical address information are comprised of a 2n+4 (n≧0)-wobble basis and the data bit "0" and "1" are distinguished from each other such that each data bit has at least three same values and at least one different value in the modulated wobble signal with respect to the 2n+4 (n≧0)-wobble basis.

16. The apparatus of claim 15, wherein the detection unit includes a 4-division photo detector, and the detection unit is to detect the wobble signal by a signal output from (A+B)−(C+D), where A, B, C and D are each region of the 4-division photo detector.

17. The apparatus of claim 15, wherein the recovering unit is to recover the physical address information comprising data bit "0" and "1" with respect to the 2n+4 (n≧0)- wobble basis.

18. The apparatus of claim 17, wherein the recovering unit is to recover the physical address information comprising the data bit "0" and "1", the data bit "0" and "1" being modulated on an 8 wobble basis respectively.

19. An apparatus for reproducing physical address information from a recording medium on which a wobble signal is modulated by a predetermined modulation method, comprising:
    a detection unit to detect the wobble signal, the detection unit including a push-pull signal detection unit to detect the wobble signal; and a decoding unit to decode the physical address information in response to the wobble signal detected from the detection unit, wherein data bit "0" and "1" comprising the physical address information are comprised of a 2n+4 ($n \geq 0$)-wobble basis and data bit "0" and "1" are distinguished from each other such that each data bit has at least three same values and at least one different value in the modulated wobble signal with respect to the 2n+4 ($n \geq 0$)-wobble basis.

20. The apparatus of claim 19, wherein the detection unit further includes a 4-division photo detector and the detection unit is to detect the wobble signal by a signal output from (A+B)−(C+D), where A, B, C and D are each region of the 4-division photo detector.

21. The apparatus of claim 19, wherein the decoding unit is to decode the physical address information comprising data bit "0" and "1" with respect to the 2n+4 ($n \geq 0$)-wobble basis.

22. The apparatus of claim 21, wherein the decoding unit is to decode the data bit "0" and "1" being modulated on an 8 wobble basis respectively.

* * * * *